United States Patent [19]

Russell

[11] 4,075,145

[45] Feb. 21, 1978

[54] PROCESS FOR PRODUCING WATER SOLUBLE RESINS

[76] Inventor: Rex Hamilton Russell, 16 Bell Street, Hamilton, New Zealand

[21] Appl. No.: 690,872

[22] Filed: May 28, 1976

[30] Foreign Application Priority Data

June 6, 1975 New Zealand .................... 177731

[51] Int. Cl.$^2$ .................... C09D 3/56; C09D 3/66; C09D 5/02
[52] U.S. Cl. .................... 260/22 M; 260/20; 260/22 CQ; 260/29.2 E; 260/29.2 UA
[58] Field of Search ............ 260/22 R, 22 M, 22 CQ, 260/20, 29.2 E, 29.2 UA

[56] References Cited

U.S. PATENT DOCUMENTS

| | | | |
|---|---|---|---|
| 2,188,890 | 1/1940 | Clocker | 260/18 R |
| 2,941,968 | 6/1960 | McKenna | 260/22 M |
| 2,944,991 | 7/1960 | Hart | 260/22 M |
| 2,991,259 | 7/1961 | Carlston | 260/22 M |
| 3,058,932 | 10/1962 | Petty | 260/18 R |
| 3,196,119 | 7/1965 | Boller et al. | 260/22 M |
| 3,207,715 | 9/1965 | Stephens | 260/22 M |
| 3,376,241 | 4/1968 | Que | 260/22 M |
| 3,412,056 | 11/1968 | Crawford et al. | 260/22 M |
| 3,423,341 | 1/1969 | Klare et al. | 260/22 M |
| 3,433,754 | 3/1969 | Honel | 260/22 M |

FOREIGN PATENT DOCUMENTS

6,613,098  2/1967  Netherlands ..................... 260/22 M

OTHER PUBLICATIONS

Patton, Alkyd Resin Technology Formulating Techniques and Allied Calculations, Interscience Publishers, N.Y., N.Y., 1962, pp. 58, 59, 102, 103, 162 & 163.

*Primary Examiner*—Ronald W. Griffin
*Attorney, Agent, or Firm*—Millen & White

[57] ABSTRACT

A process for producing water soluble, storage stable resins in which a maleinised or fumarated oil or mixture of oils is reacted with a mixutre of polyols and a difunctional acid.

10 Claims, No Drawings

PROCESS FOR PRODUCING WATER SOLUBLE RESINS

BACKGROUND OF THE INVENTION

This invention relates to the production of water soluble, storage stable resins.

The three most essential features of a water-soluble resin system are water-solubility, satisfactory end-use properties, and storage stability.

Water-thinnability can be achieved in various ways;

1. The formation of polymer or polyester chains carrying free acid groups along the length of the chains; solubility in water being achieved by the addition of amine bases such as ammonia, triethylamine. The acid groups in question are usually carboxyl groups originating from di- or polycarboxylic acids incorporated in the resin formulation, but can also be sulphate groups added onto the polymer or polyester molecule, usually at points of unsaturation, (so-called anionic systems);

2. polymer or polyester chains carrying hydroxyl or polyethylene oxide groups, and thus giving water-solubility due to the affinity to water of the hydroxyl or polyethoxy groups (so-called nonionic systems);

3. Chains carrying amine groups; solubility in water being obtained by quaternisation with acids (so-called cationic systems);

4. dispersion in stable aqueous emulsion; here insoluble polymer or polyester material is held in suspension in fine particles in water with the aid of surfactants and viscosity controlling protective colloids.

Various resin systems can be designed incorporating the above means of achieving water-thinability. Well known examples include acrylic- or vinyl copolymers with unsaturated acids, plasticized phenolic mixtures, maleinised and fumarated oils, alkyds based on tri- or polybasic acids, alkyds incorporating polyethylene or polypropylene glycol or monoether derivatives, alkanolamine condensates and emulsions or lactices of alkyds and of copolymer materials such as P.V.A., polystyrene, polyacrylics.

In the case of resins for paints, film-formation presents special problems with water-soluble systems by virtue of working with a system which must be ideally perfectly water-thinnable for application, but finally after drying or curing must be as resistant to water as any conventional solvent based system, and must have equivalent mechanical properties (such as adhesion, impact resistance, hardness, flexibility etc.). It is evident for this reason that latex systems are favored for air-drying coatings; such products can be made with suitably low quantities of surfactant and protective colloid so as to give a water resistant film after coalescence of the fine polymer particles on drying. In this field little success has been achieved with products made water-soluble by the means listed under 1, 2, and 3 above, because such products to not give satisfactory weather resistance. The main interest in considering such products for air drying paints is for gloss and brushability which cannot be fully obtained even by the newer modified latex systems.

In the case of stoving systems the amine base solubilized resins are more interesting, and in fact offer the widest scope for development of all the means available for obtaining water-solubility. The large number of acid groups present help to catalyze the reaction between the hydroxyl groups which are usually also present in large numbers and co-reacting amino-resins. In particular in the case of carboxyl acid groups there is the further possibility of the acid groups reacting during curing with the hydroxyl groups to give an alkali resistant film. If such resins are readily water-soluble with reasonably low amounts of volatile amine bases (B.P. less than 150° C), curing is complete after a conventional stoving cycle. There remains the problem of formulating to high acid number a resin giving the required mechanical properties with reasonably low proportions of amino-resin, and having acceptable storage stability.

SUMMARY OF THE INVENTION

In order to produce a product having the lowest possible raw material cost compatible with satisfactory film forming properties, it is obviously advantageous to take the classic alkyd resin type as starting point. It is also an advantage to incorporate phthalic anhydride in the product to obtain the required film properties. Most conveniently, and in fact in the present case, water-solubility is achieved entirely by means listed under 1 and 2 above, thus with an acid number derived from carboxyl groups in the range 55–80, and a theoretical formula hydroxy number 70–120, giving ready solubility in water with a minimum of amine base.

Storage stability is a difficulty with products of this type, i.e. alkyd resins short-stopped during processing at a high acid number. Normally such products when solubilized with amine bases in a mixture of Cellosolve ® and water exhibit a limited storage stability in the conventional test involving storage at 35% non-volatiles in a 55°-60° C oven. After about a week, samples show separation into two liquid or liquid/solid layers with a corresponding drop in pH. Addition of amine base to restore the pH to its original value does not however restore the product to its original homogeneous condition. On the other hand products which are satisfactory in this test can be restored to their original condition by addition, if necessary, of base even after several months storage in the test oven.

It is well-known that water-soluble alkyds incorporating polycarboxylic acids such as trimellitic anhydride etc. can be made to have good film forming properties and also good storage stability. In the patent literature numerous examples are given; the field being well covered. It seems therefore advantageous to incorporate a polyfunctional acid-analogue into the PA (phthalic anhydride) containing resin to obtain the required storage stability.

A lot of work in water-solubles has been done with maleinised fatty acids. Variations include styrenation and condensation with a variety of polyols. Until now there are no reports of a maleinised or fumarated oil reacted with a mixture of polyols and phthalic anhydride. A consideration of this idea, on a theoretical basis, would suggest the likelihood that processing a straight mixture of maleinised oil with PA plus polyol would give a two-component non-homogenous mixture of partly esterified maleinised oil and PA/polyol polyester. In fact during processing of such systems this seems to be confirmed in the first few hours of reaction by the presence of a strong turbidity or cloudiness. However, with the formulations developed in this work for water-solubles, the cloudiness slowly disappears with processing, and finally disappears completely to give a clear product just before the acid number has dropped to the minimum level for water-solubility.

Broadly, the invention consists of a process for producing water-soluble resins including the steps of (1) treating a glyceride oil or mixture of oils with maleic acid, maleic anhydride or fumaric acid, and (2) polyesterifying the product of step (1) with a mixture of phthalic anhydride, isophthalic acid and/or dicarboxylic acids and one or more polyols.

DETAILED DISCLOSURE

A typical formulation involves "maleninising" or "fumarating" an unsaturated oil with maleic acid, maleic anhydride or fumaric acid. Processing is conventional, from one half to two hours heating at from 200° C to 240° C. The maleinised or furmarated oil is then allowed to cool, and at a convenient termperature calculated quantities of phthalic anhydride and glycerol are added. The mixture is slowly heated to reaction temperature. The anhydride reaction starts well below 200° C, and later the true acid-polyol condensation commences towards 205° C with the distillation of water. The product mixture is usually cloudy or turbid for the first two hours of processing, and then gradually becomes clear at acid number 90-100. With most formulations the product is perfectly clear (hot and cold) at an acid number of 60-70, which is normally optimum for water-solubility and film-forming properties, after three to four hours processing.

Thus the process can be considered to take place in two simple steps;

(1) maleinisation or fumarisation of an oil, and
(2) polyesterification with phthalic anhydride and polyol.

It is preferable that these steps be carried out in the above order however it is envisaged that they could be carried our simultaneously.

Various modification of formula are possible involving styrenation; the incorporation of material such as rosin, fatty acids, hydrocarbon resins, phenolic resins etc. in the maleinising or fumarating step, and the use of different polyol mixtures such as pentaerythritol/ethylene glycol, trimethylolpropane and/or trimethyloleth ane, along with phthalic anhydride or isophthalic acid etc. in the poly-condensation step.

When the required acid number is reached (this is generally between 55 to 80) usually more rapidly and at processing temperature lower than for conventional alkyd processing, the product is cooled and dissolved in a convenient quantity of water-miscible solvent such as one of the glycol ether derivatives, and after further cooling and under agitation, the solubilising base (e.g. a mixture of dimethylaminoethanol and ammonia) is added, and the solution adjusted to the required non-volatiles content with water.

Water-thinnable paint systems can be made incorporating the above resins, suitable pigments, suspending agents, and for stoving systems, appropriate co-reacting resins such as water-thinnable amino-resins.

The invention is illustrated by the following examples:

EXAMPLE 1

214 parts by weight of dehydrated castor oil (D.C.O.), 214 parts by weight of soya oil and 80 parts by weight of maleic anhydride were charged in an alkyd resin kettle, and heated under inert gas and stirring. At 120° C the stirring was stopped, and 98 parts by weight of rosin was added, then the stirring re-started. The batch was heated to 200° C, held one hour at this temperature, and then cooled. At 150° C 154 parts by weight of phthalic anhydride and 265 parts by weight of trimethylolpropane were added, and the batch reheated, held one and a half hours at 175° C. Initially the product was hazy in appearance, but slowly became clear, with the distillation of water of reaction towards the end of this period of the processing. The temperature was raised 10° C every further half hour so that after a further hour of processing and distillation of more water of reaction, the acid value had fallen to 77, at which point the heating was stopped, and the batch cooled.

The reaction product had an acid number of 71, and a viscosity (50% solution in Xylol) of F - G (Gardner—Holdt).

1000 parts by weight of the reaction product at 120° C was added with stirring to a mixture of 200 parts by weight of ® Cellosolve and 83 parts by weight of isopropanol. At 75° C 50 parts by weight of dimethylaminoethanol dissolved in 50 parts by weight of water was slowly added. After 10 minutes of stirring, 116 parts by weight of water was added, then 50 parts by weight of ammonia was added slowly in small portions to bring the pH to around 9-10 (the pH normally drops back to around 8 during the first week of storage). Finally the nonvolatiles content was adjusted with water to give 60% N.V. The viscosity of this water-thinnable solution was U - W (Gardner—Holdt).

EXAMPLE 2

386 parts by weight of safflower oil and 65 parts by weight of maleic anhydride were heated to 200° C, held 1 hour, and then cooled. At 150° C, 328 parts by weight of phthalic anhydride, 96 parts by weight of pentaerythritol and 150 parts by weight of ethylene glycol were added, and the batch re-heated. Processing was continued following a procedure similar to that outlined for Example 1 above.

The reaction product had an acid number of 66, and a viscosity (50% solution in Xylol) of S - V (Gardner—Holtd).

Thinning was carried out as in Example 1, using 1000 parts by weight of resin, 185 parts by weight of ® Cellosolve, 162 parts by weight of isopropanol, 77 parts by weight of ® Butyl Cellosolve, 62 parts by weight of dimethylaminoethanol, 31 parts by weight of ammonia and 123 parts by weight of water, to give a water-thinnable solution of 65% non-volatiles and viscosity V - X (Gardner—Holdt).

A stoving primer paint made using this resin solution plus a water-thinnable amino-resin in the proportion of resins solids by weight of 4:1, and incorporating an appropriate mixture of pigments (pigment/binder ration 1:1) and suitable suspending agents etc., when thinned and sprayed onto steel panels, and stoved for 30 minutes at 150° C, gave satisfactory test results for flexibility, hardness, adhesion and corrosion resistance as well as storage stability, quite comparable to those obtained from a conventional solvent-type short oil alkyd based primer correspondingly formulated.

EXAMPLE 3

196 parts by weight of D.C.O., 196 parts by weight of soya oil, 73 parts by weight of maleic anhydride and 198 parts by weight of rosin were heated to 200° C, held one hour in the initial maleinisation step, then reacted with 172 parts by weight of phthalic anhydride and 190 parts by weight of glycerol in the polyesterification step, according to the plan of processing outlined in Examples 1 and 2. Thinning to the water-soluble form was also as described above.

EXAMPLE 4

389 parts of safflower oil and 87 parts of fumaric acid were held one hour at 200° C, then the product was reacted as outlined in Example 1 with 242 parts of phthalic anhydride and 307 parts of trimethylolpropane.

EXAMPLE 5

392 parts by weight of linseed oil, 95 parts by weight of maleic anhydride and 110 parts by weight of rosin were held one hour at 200° C, then reacted with 191 parts by weight of phthalic anhydride, 92 parts by weight of pentaerythritol and 145 parts by weight of propylene glycol.

What is claimed is:

1. A process for producing water-soluble resins comprising the steps of:
    (1) reacting (a) an unsaturated triglyceride oil or a mixture thereof, or (b) the reaction product of an unsaturated triglyceride oil or a mixture thereof and at least one of styrene, vinyl-toluene and methylmethacrylate, with maleic acid, maleic anhydride or fumaric acid, and
    (2) polyesterifying the product of Step (1) with a mixture of at least one dicarboxylic acid or anhydride thereof and one or more polyols in proportions to give an hydroxy number of 70 to 140 at the theoretical end-point of reaction, until the resultant product is clear and has an acid value of 55 to 80.

2. A process according to claim 1 wherein in Step (1) maleic acid, maleic anhydride or fumaric acid is reacted with (b).

3. A process according to claim 1 wherein in Step (1) maleic acid, maleic anhydride or fumaric acid is reacted with (a).

4. A process according to claim 3 wherein the equivalent weight proportion of maleic acid, maleic anhydride or fumaric acid to (a) is within the range of 0.65 – 2.00 : 1.

5. A process according to claim 3 wherein the equivalent weight proportion of maleic acid, maleic anhydride or fumaric acid to (a) is within the range 1.00 – 1.75 : 1.

6. A process according to claim 3 wherein in Step (2) the polyol is:
    (a) one or more diols selected from the group consisting of ethylene glycol, propylene glycol, butanediol and pentanediol,
    (b) pentaerythritol,
    (c) a mixture of one or more of said diols and pentaerythritol,
    (d) glycerol,
    (e) trimethylolpropane or
    (f) trimethylolethane, and the polyhydric alcohol is present in an amount within the range of 15% to 45% by weight of the total final resin weight.

7. A process according to claim 3, wherein during Step (1) the triglyceride oil is reacted simultaneously with rosin, a hydrocarbon resin or a phenolic resin.

8. A process according to claim 7, wherein during Step (1) the triglyceride oil is simultaneously reacted with rosin, in an amount of up to 40% by weight of the final product.

9. A process according to claim 7, wherein during Step (1) the triglyceride oil is simultaneously reacted with rosin, in an amount of up to 30% by weight of the final product.

10. A process according to claim 1 wherein phthalic anhydride is employed in Step (2), in an amount within the range of 10 to 40% by weight of total final resin weight.

* * * * *